United States Patent
Lin et al.

(10) Patent No.: US 8,358,460 B2
(45) Date of Patent: Jan. 22, 2013

(54) QUASI-PHASE MATCHED OPTICAL WAVEGUIDE FOR PREVENTING BACK CONVERSION

(75) Inventors: Shih-Chiang Lin, Dashu Township, Kaohsiung County (TW); Nai-Hsiang Sun, Dashu Township, Kaohsiung County (TW); Po-Jui Chiang, Dashu Township, Kaohsiung County (TW)

(73) Assignee: I Shou University, Dashu Township, Kaohsiung County (TW)

( * ) Notice: Subject to any disclaimer, the term of this patent is extended or adjusted under 35 U.S.C. 154(b) by 132 days.

(21) Appl. No.: 12/759,179

(22) Filed: Apr. 13, 2010

(65) Prior Publication Data

US 2011/0249317 A1    Oct. 13, 2011

(51) Int. Cl.
*G02F 1/35* (2006.01)
*H01S 3/10* (2006.01)

(52) U.S. Cl. ............................. 359/328; 372/21; 372/22
(58) Field of Classification Search ........... 359/326–332
See application file for complete search history.

(56) References Cited

U.S. PATENT DOCUMENTS 6,839,365 B1 * 1/2005 Sonoda et al. ................. 372/22
2007/0053388 A1 * 3/2007 Mizuuchi ....................... 372/21

* cited by examiner

*Primary Examiner* — Hemang Sanghavi
(74) *Attorney, Agent, or Firm* — Kilpatrick Townsend & Stockton LLP

(57) ABSTRACT

A QPM waveguide includes an optical substrate having periodic domain-inverted regions and non-inverted regions which are arranged alternately, and a waveguide part passing through the domain-inverted regions and non-inverted regions. The substrate is divided into at least two sections each of which has a wave input facet and a wave output facet. At least one band-pass filter layer is disposed on the wave input facet of one section to filter out a signal wave for preventing back conversion so that the energy of the conversion wave can increase. A method for preventing the back conversion is also disclosed.

8 Claims, 6 Drawing Sheets

QUASI-PHASE MATCHED OPTICAL WAVEGUIDE FOR PREVENTING BACK CONVERSION

BACKGROUND OF THE INVENTION

1. Field of the Invention

The invention relates to an optical waveguide, more particularly, to a quasi-phase matched optical waveguide for preventing a back conversion process occurring during the generation of a conversion wave.

2. Description of the Related Art

Quasi-phase matched (QPM) waveguide devices such as periodically poled lithium niobate waveguides have been applied in optical sampling systems and all-optical logic processes. Such optical sampling systems and all-optical logic processes are based on a specific cascaded quadratic nonlinear process $\chi 2:\chi 2$ in a QPM waveguide to induce cascaded second-harmonic generation (SHG) and difference-frequency generation (DFG). In the cascaded SHG+DFG process, a launched pump wave (P wave) generates its second harmonic wave (PP wave) via a SHG process, and then the second-harmonic wave immediately interacts with another launched signal wave (S wave) to generate a conversion wave (C wave) via a DFG process. The conversion wave also interacts with the second harmonic wave to generate the signal wave via a DFG process. When the phase difference between the conversion wave and its coupling component is out of phase, the coupling component destructively interferes with the conversion wave and reduces the energy of the conversion wave. The process by which pulse energy of the conversion wave declines is called back-conversion which, apparently, reduces the conversion efficiency of the conversion wave of the cascaded SHG+DFG process. In a back-conversion process, the conversion wave interacts with the signal wave to generate the second-harmonic wave by sum-frequency generation. Therefore, both of the energies of the conversion wave and the signal wave decline.

The factors affecting such back conversion have been investigated which include chromatic dispersion, pulse duration and peak power. When the peak power is low, chromatic dispersion strongly affects the back conversion phenomenon. If an input power is high, the magnitude of the power will dominate the back conversion effect.

In Shih-Chiang Lin et al. "Enhanced Cascaded SHG+DFG Process of Femtosecond Pulses Using QPM Waveguide," IEEE J. Lightwave Tech., 26, 3090-3098, (2008), a chirp QPM waveguide has been proposed to reduce the back conversion effect and enhance the cascaded SHG+DFG process for a lower power case. But such a chirp QPM waveguide is not suitable for high power situations.

Since the back conversion is caused by the destructive interference between the conversion wave and a component resulting from the coupling of the second harmonic wave with the signal wave, removal of such a signal or second harmonic wave component may help to break the mechanism of back conversion. However, as the second harmonic wave is important and cannot be removed, it is only the signal wave that can be removed to prevent back conversion.

SUMMARY OF THE INVENTION

An object of the present invention is to provide a QPM optical waveguide that can alleviate the problem of back conversion encountered in the prior art.

Another object of the present invention is to provide a method of preventing back conversion that occurs in a QPM waveguide during the generation of a conversion wave.

According to one aspect of the present invention, a quasi-phase matched (QPM) waveguide for inducing generation of a second harmonic wave from a pump wave and generation of a conversion wave from the second harmonic wave and a signal wave, comprises an optical substrate having periodic domain-inverted regions and non-inverted regions which are arranged alternately and a waveguide part passing through the domain-inverted regions and non-inverted regions and extending along the wave propagation direction for guiding the pump, second harmonic, signal and conversion waves. The optical substrate is divided into at least two sections each of which has a wave input facet and a wave output facet. The wave input facet of one of the sections confronts the wave output facet of a front one of the sections. The QPM waveguide further comprises at least one band-pass filter layer disposed on the wave input facet of one of the sections and adapted to filter out the signal wave for preventing back conversion. The optical substrate is divided at a predetermined location of said waveguide part where the conversion wave starts to decline due to back conversion so that the band-pass filter layer is located at the predetermined location.

According to another aspect of the present invention, a method of preventing a back conversion process occurring during generation of a conversion wave by coupling a second harmonic wave of a pump wave with a signal wave, comprises: providing an optical substrate that is periodically poled and that has a waveguide part extending along a wave propagation direction; launching the pump and signal waves into the waveguide part to generate the second harmonic wave and the conversion wave; determining a propagation distance for at least one location where the conversion wave starts to decline due to back conversion; sectioning the optical substrate at the location so that the optical substrate is divided into at least two sections each of which has a wave input facet and a wave output facet; disposing a band-pass filter layer at the location and on the wave input facet of one of the sections to filter out the signal wave for preventing back conversion.

As the signal wave is removed, the back conversion process can be eliminated, and the second harmonic wave can continuously couple its energy to both of signal and conversion waves. Therefore, the energy of conversion wave can increase further.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
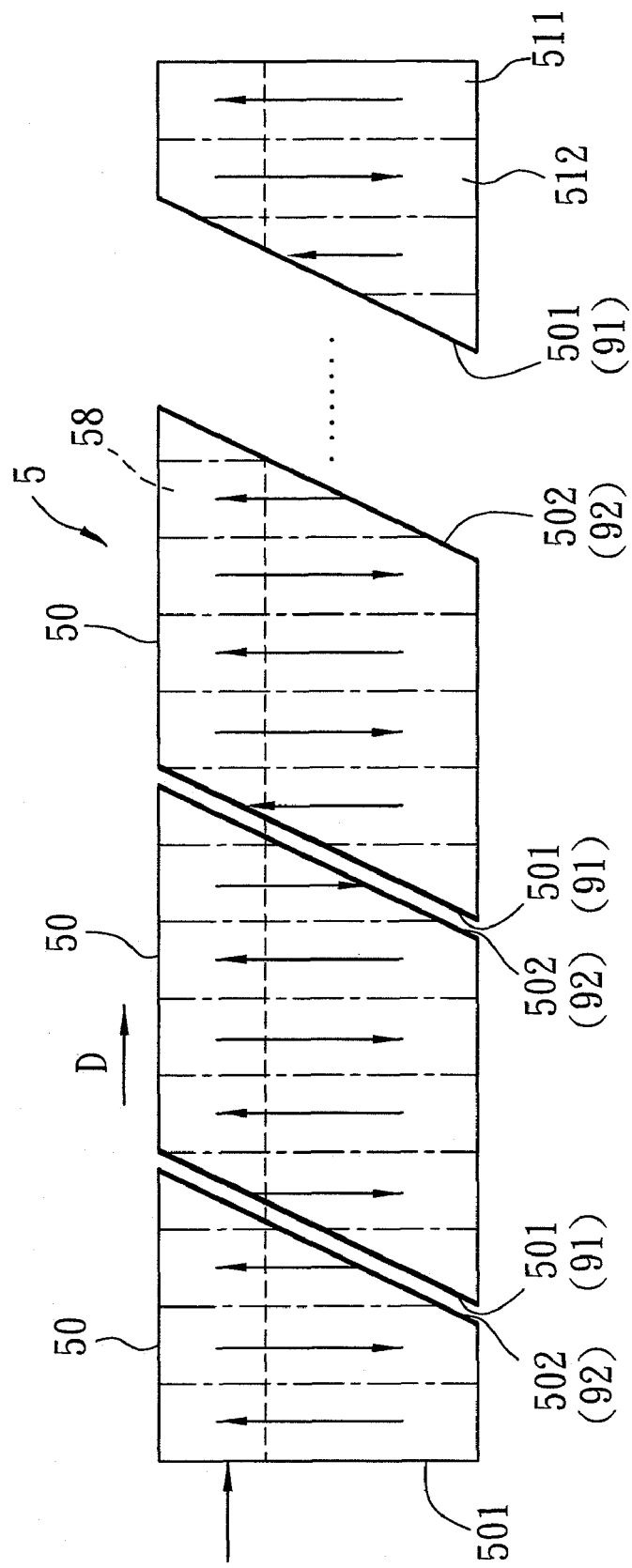
FIG. 1 is an elevation view illustrating a QPM waveguide device embodying the present invention.
Figure 2:
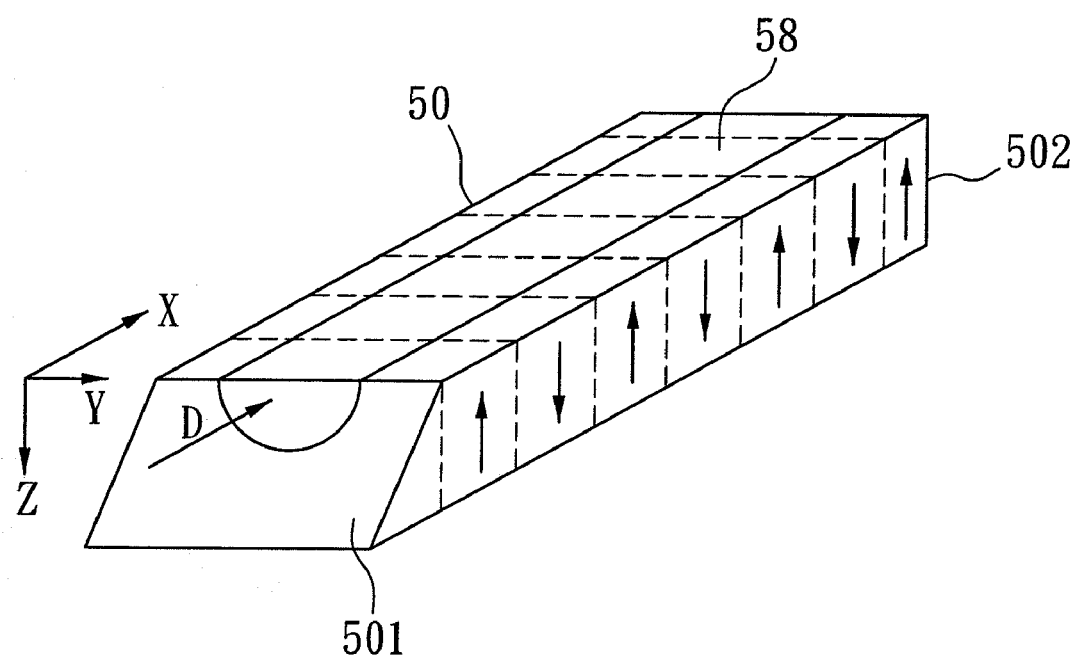
FIG. 2 is a perspective view of one of the sections of the QPM waveguide device.

Referring to FIGS. 1 and 2, there is shown a QPM waveguide device which includes an optical substrate 5 that is divided into a plurality of sections 50. The optical substrate 5 is made from a ferroelectric material that can be polarized periodically and that exhibits a stable polarity at high temperature. Examples of the ferroelectric materials include $LiNbO_3$, $LiTaO_3$, $GaAs$, $KTiOPO_4$, $RbTiOPO_4$, $RbTiAsPO_4$, $KH_2PO_4$, $BaB_2O_4$, $CsB_3O_5$ and $KTiOAsO_4$. In this embodiment, the optical substrate 5 is made from $LiNbO_3$.

Figure 3:
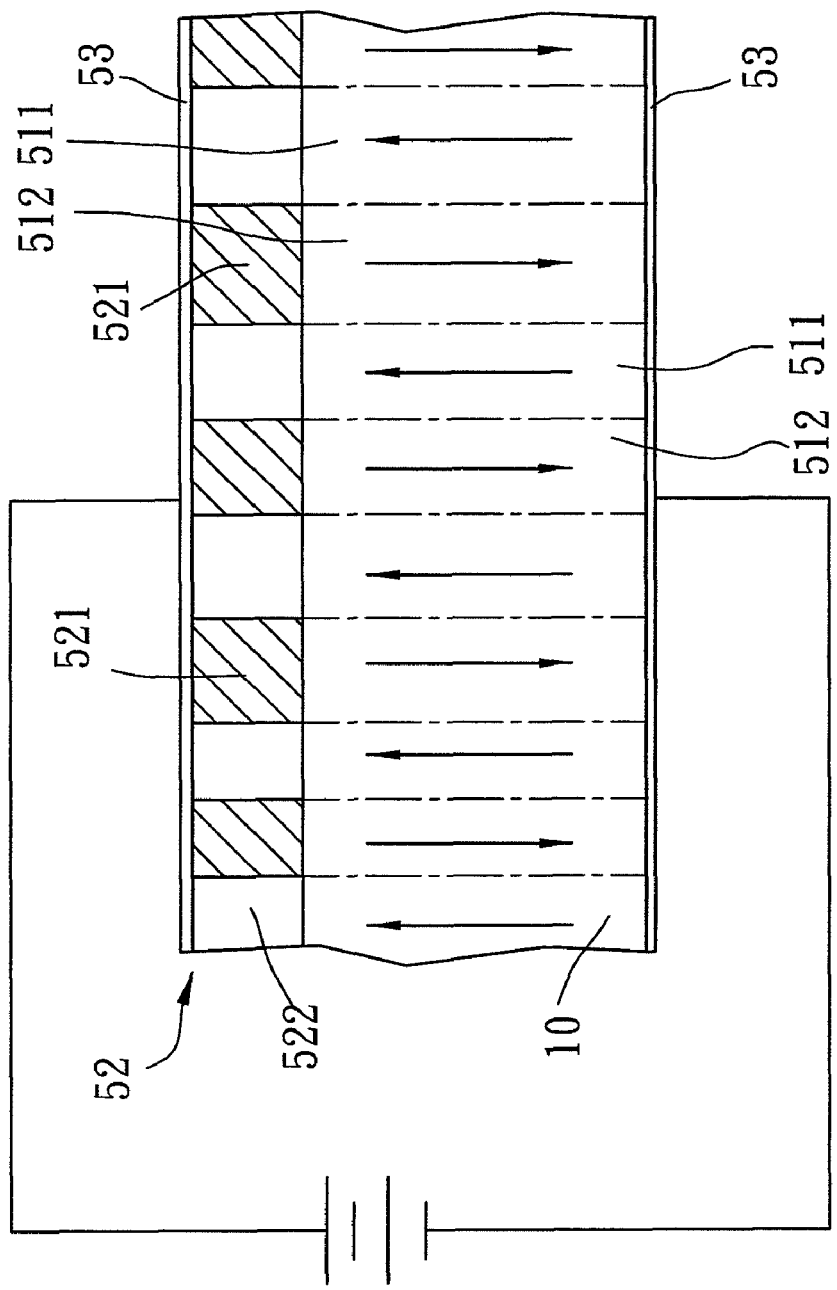
FIG. 3 illustrates that an optical substrate is subjected to thermal poling to fabricate the QPM wave-guide device.
Figure 4:
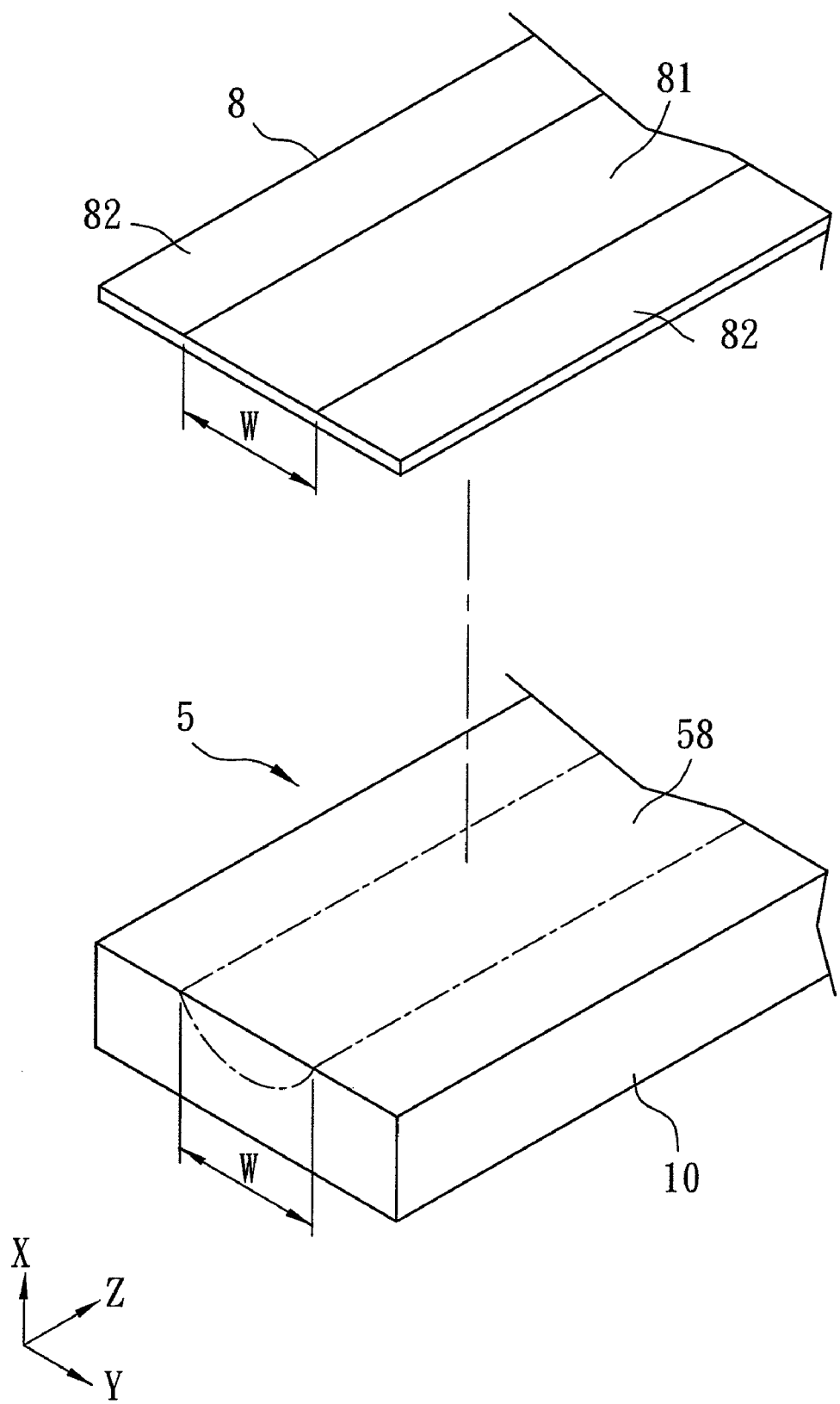
FIG. 4 illustrates that a waveguide part is formed in an optical substrate using a mask.

Referring to FIGS. 3 and 4, there is shown a fabrication process for fabricating the optical substrate 5. In the process, an aluminum grating 52 is formed on an upper surface of a plate 10 made of $LiNbO_3$, and includes a plurality of aluminum strips 521. The gaps between the aluminum strips 521 are filled by strips of a photoresist pattern 522. To conduct a thermal poling process, the aluminum grating 52 and the photoresist pattern 522 are covered by a layer of a liquid electrode 53, and the lower surface of the plate 10 is covered by another layer of the liquid electrode 53. The plate 10 is then poled periodically by applying an electric field through the liquid electrode 53 and the aluminum grating 52. Due to the electric field, the regions of the plate 10 beneath the aluminum strips 521 become domain-inverted regions 512 which alternate with non-inverted regions 511 underlying the strips of the photoresist pattern 522. The domain-inverted regions 512 and the non-inverted regions 511 have first and second polarities, respectively. When the strength of the electric field is lowered slowly, the polarities of the plate 10 become stable.

After the plate 10 is thermal poled, the electric field, the aluminum grating 52, the photoresist pattern 522 and the liquid electrode 53 are all removed, and a chromium mask 8 is disposed on the plate 10 as shown in FIG. 4. A middle part of the mask 8 has a first shield portion 81 with a width (W), and the remaining parts are second shield portions 82. Only the second shield portions 82 are plated with chromium. The plate 10 together with the mask 8 is dipped into a benzoic acid solution at a temperature of 200° C. for one hour. Parts of the plate 10 covered by the second shield portions 82 do not react with the benzoic acid solution. However, the part of the plate 10 covered by the first shield portion 81 undergoes a proton-exchange reaction with the benzoic acid solution as follows:

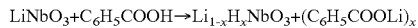

$$LiNbO_3 + C_6H_5COOH \rightarrow Li_{1-x}H_xNbO_3 + (C_6H_5COOLi)_x$$

After reaction, the part of the plate 10 covered by the first shield portion 81 of the mask 8 is formed into a waveguide part 58. The mask 8 is then removed, and the plate 10 is annealed slowly at 450° C. for about one hour. The resulting waveguide part 58 has a refractive index higher than that of the remaining parts of the plate 10. The optical substrate 5 is therefore formed, and includes the waveguide part 58 and the domain-inverted regions 512 and the non-inverted regions 511.

Referring back to FIGS. 1 and 2, the domain-inverted regions 512 and the non-inverted regions 511 are arranged alternately along a wave propagation direction (D) and the waveguide part 58 passes transversely through the domain-inverted regions 512 and the non-inverted regions 511 and extends along the wave propagation direction (D).

A back conversion process can be prevented by using the optical substrate 5 in combination with band-pass filter layers 91 which are described hereinafter. A pump wave and a signal wave are launched into the waveguide part 58 to generate a second harmonic wave which in turn generates conversion wave by interacting with the signal wave. Thereafter, the locations where the energy of the conversion wave starts to decline due to back conversion are determined. The locations are identified in terms of the distance of wave propagation. The optical substrate 5 is then sectioned at the determined locations and divided into multiple sections 50. Each section 50 has a wave input facet 501 and a wave output facet 502 both of which are transverse to the wave propagation direction (D). Preferably, the optical substrate 5 is sectioned at the determined locations along inclined planes which are inclined with respect to a plane perpendicular to the wave propagation direction (D). The wave input and output facets 501, 502 are therefore inclined with respect to a plane that is perpendicular to the wave propagation direction (D).

A band-pass filter layer 91 is coated on the wave input facet 501 of each section 50 in order to filter out the signal wave that destructively interferes with the conversion wave. An anti-reflection layer 92 may be coated on the wave output facet 92 to reduce reflection. As a declination of the energy of the conversion wave is caused by the back conversion process which results from the coupling of the signal wave with the second harmonic wave, and as the band-pass filter layers 91 are provided at the locations where the conversion wave starts to decline so as to filter out the signal wave, the back conversion phenomenon can be effectively reduced.

Figure 5:
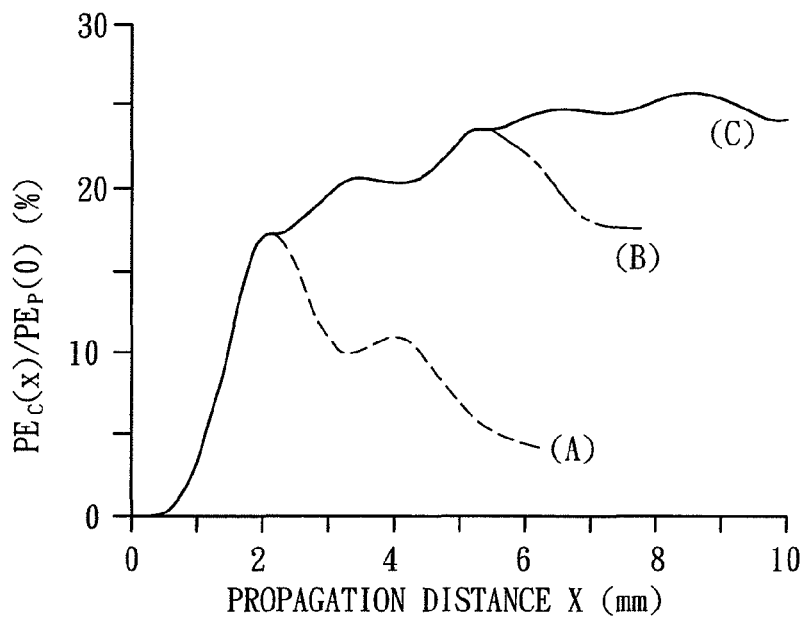
FIG. 5 shows plots (A), (B) and (C) obtained by plotting conversion efficiency as a function of propagation distance.

Experiments were conducted to investigate conversion efficiencies of a normal uniform QPM waveguide that has no band-pass filter layer 91, and the uniform QPM waveguide device having the band-pass filter layer 91 by employing a launched a pump wave (P) and a lunched signal wave (S) to generate a conversion wave. FIG. 5 shows plots of conversion efficiency (pulse energy of conversion wave $PE_c$/pulse energy of input pump wave $PE_p$) as a function of propagation distance (X). Plots (A), (B) and (C) respectively represent conversion efficiencies of the uniform QPM waveguide without the band-pass filter layer 91, the uniform QPM waveguide having one band-pass filter layer (filter-1) 91 and one anti-reflection layer 92, and the uniform QPM waveguide having two band-pass filter layers 91 (filters 1 and 2) and two anti-reflection layers 92. In the QPM waveguide without the band-pass filter layer 91, the $PE_c$ thereof reaches a maximum at x=2.13 mm and then starts to decline at x>2.13 mm due to the back conversion process. When the band-pass filer layer (filter-1) is disposed at x=2.13 mm of the QPM waveguide, the $PE_c$ thereof does not decline at x=2.13 mm and rather increases continuously until it reaches the next maximum at x=5.39 mm. This is because the back conversion process is reduced or eliminated at x=2.13 mm. As the propagation distance increases from x=5.39 mm, the $PE_c$ decreases once again. When the second band-pass filter layer (filter-2) is disposed at x=5.39 mm of the normal QPM waveguide to prevent back conversion, the EP, increases at x=5.39 rather than being decreased.

Figure 6:
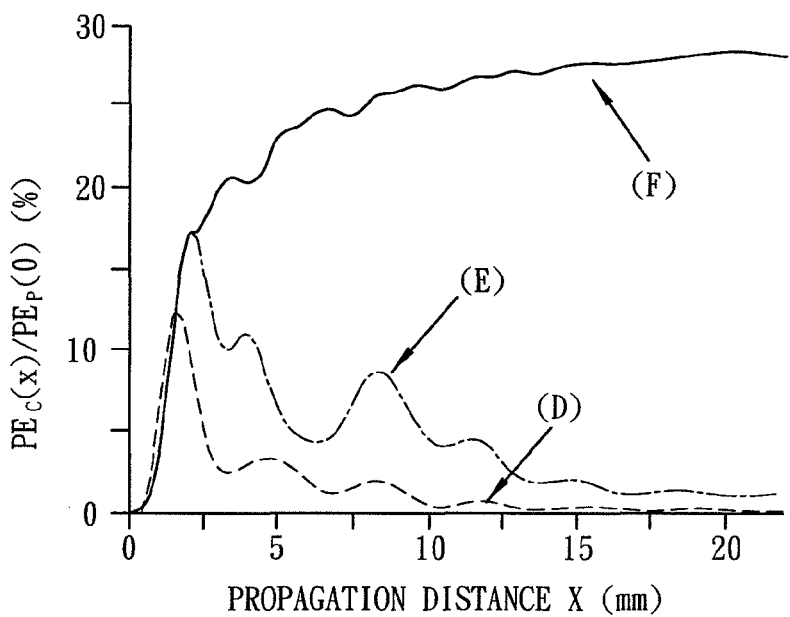
FIG. 6 shows plots (D), (E) and (F) which are also obtained by plotting conversion efficiency as a function of propagation distance.

Referring to FIG. 6, plots (D), (E) and (F) represent the conversion efficiencies of the normal uniform QPM waveguide without band-pass filter layer 91, the uniform QPM waveguide operated with a time delay, and the uniform QPM waveguide operated with the time delay and six band-pass filter layers 91, respectively. The time delay refers to the arrangement of the launched pump wave to lag behind the lunched signal wave in order to reduce the walk-off effect that occurs due to the group velocity of the second harmonic wave that is much faster than the group velocity of the signal wave. The locations of the six band-pass filter layers are at x=2.13, 5.39, 8.54, 11.69, 14.73 and 17.71 mm, respectively. The maximum conversion efficiencies are 12.21%, 17.22% and 28.39% for the plots (D), (E) and (F), respectively. The pulse-width of the input pump wave is 0.6 ps and the pulse energy thereof is 100 pj.

Figure 7:
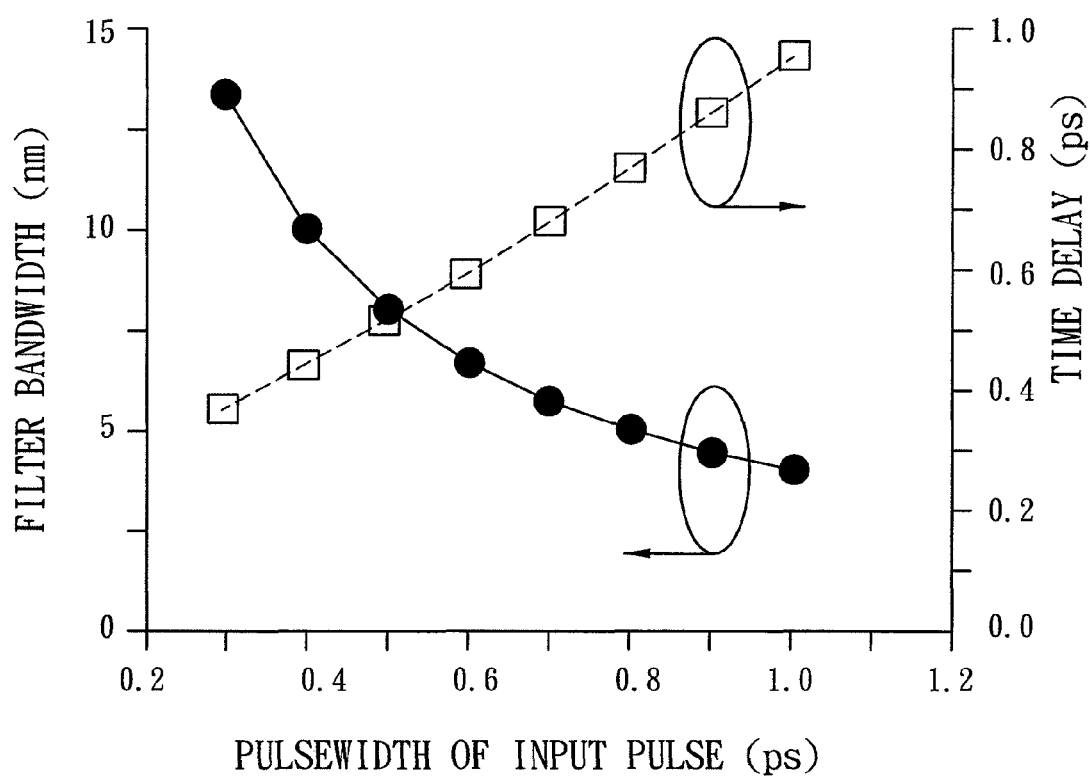
FIG. 7 shows plots of filter bandwidth and time delay versus pulse width of input pump wave.

FIG. 7 shows optimum bandwidth of the band-pass filter and time delay versus the pulse width of the input pulse under the condition of the same peak power. The optimum bandwidth of the band-pass filter layer and time delay for the input pump wave of 0.6 ps are 6.67 nm and 0.58 ps. The wavelength for the pump, second-harmonic, signal and conversion wave are 1560, 780, 1540, and 1580.52 nm, respectively.

As described above, with the use of the band-pass filter layers 91 in the uniform QPM waveguide according to the present invention, the back-conversion phenomenon can be reduced or eliminated, and the energy of conversion wave can increase continuously. The maximum conversion efficiency of a 22 mm QPM waveguide can be increased to 232% compared to that of the normal QPM waveguide without the band-pass filter layers 91.

While the present invention has been described in connection with what is considered the most practical and preferred embodiments, it is understood that this invention is not limited to the disclosed embodiment but is intended to cover various arrangements included within the spirit and scope of the broadest interpretation so as to encompass all such modifications and equivalent arrangements.

What is claimed is:

1. A method of preventing a back conversion process occurring during generation of a conversion wave by coupling a second harmonic wave of a pump wave with a signal wave in a waveguide that includes an optical substrate that is periodically poled and that has a waveguide part extending along a wave propagation direction, the method comprising:
    launching the pump and signal waves into the waveguide part to generate the second harmonic wave from the pump wave and the conversion wave from an interaction of the second harmonic wave with the signal wave;
    determining a location, in terms of a propagation distance, where the energy of the conversion wave starts to decline due to destructive interference between the signal wave and the conversion wave;
    sectioning the optical substrate at the location so that the optical substrate is divided into at least two sections that are oriented along the wave propagation direction, each of the sections having a wave input facet and a wave output facet, the wave output facet of an upstream one of the sections facing the wave input facet of a downstream one of the sections; and
    disposing a band-pass filter layer at the location and between the wave output facet of the upstream one of the sections and the wave input facet of the downstream one of the sections to filter out the signal wave to prevent the signal wave from destructively interfering with the conversion wave, thereby preventing the back conversion process.

2. The method of claim 1, further comprising disposing an anti-reflection layer on said wave output facet of the upstream one of said sections.

3. The method of claim 1, wherein said optical substrate is divided into more than two said sections, a plurality of said band-pass filter layers are provided between said sections.

4. The method of claim 1, wherein said optical substrate is made of lithium neobate.

5. The method of claim 1, wherein the pump wave lags behind the signal wave.

6. The method of claim 1, wherein the wave input and output facets are inclined with respect to a plane that is perpendicular to the wave propagation direction.

7. A method of generating a conversion wave by interacting a pump wave with a signal wave, comprising:
    providing a waveguide that includes an optical substrate that is periodically poled and that includes a waveguide part extending along a wave propagation direction;
    launching a pump wave and a signal wave into the optical substrate to generate a second harmonic wave from the pump wave and to generate the conversion wave from an interaction of the second harmonic wave with the signal wave; and
    disposing a band-pass filter in the optical substrate to filter out the signal wave at a location where the signal wave destructively interferes with the conversion wave.

8. The method of claim 7, wherein the band-pass filter is disposed at a location where the energy of the conversion wave starts to decline in the optical substrate.

* * * * *